United States Patent
Brody (10) Patent No.: US 10,586,295 B2
(45) Date of Patent: Mar. 10, 2020

(54) UPDATEABLE ELECTRONIC DIGITAL ASSETS WILL OR TRUST METHOD AND SYSTEMS WITH REAL TIME ACCESS FOR UPDATED DESIGNATED WILL OR TRUST ELEMENTS

(71) Applicant: DigiState Planning, LLC., Arvada, CO (US)

(72) Inventor: Robert F. Brody, Arvada, CO (US)

(73) Assignee: DigiState Planning, LLC., Arvada, CO (US)

( * ) Notice: Subject to any disclaimer, the term of this patent is extended or adjusted under 35 U.S.C. 154(b) by 254 days.

(21) Appl. No.: 14/999,029

(22) Filed: Mar. 21, 2016

(65) Prior Publication Data
US 2018/0082391 A1    Mar. 22, 2018

(51) Int. Cl.
*G06Q 20/02* (2012.01)
*G06Q 50/18* (2012.01)

(52) U.S. Cl.
CPC ........... *G06Q 50/186* (2013.01); *G06Q 20/02* (2013.01)

(58) Field of Classification Search
CPC .............................. G06Q 50/186; G06Q 20/02
USPC ... 705/311, 312, 317, 319, 342, 345, 35, 1.1
See application file for complete search history.

(56) References Cited

U.S. PATENT DOCUMENTS

| | | | | |
|---|---|---|---|---|
| 7,454,376 B1* | 11/2008 | Argenbright | ........... | G06Q 40/00 705/35 |
| 7,580,877 B1* | 8/2009 | Argenbright | ........... | G06Q 20/10 705/35 |
| 2014/0337059 A1* | 11/2014 | Simon | .................. | G06Q 50/186 705/4 |
| 2017/0180372 A1* | 6/2017 | Bezold | ................ | G06F 21/6209 |

* cited by examiner

*Primary Examiner* — Igor N Borissov
(74) *Attorney, Agent, or Firm* — Kirton McConkie; Brian Tucker (57) ABSTRACT

A method and systems that provide for a updateable electronic digital assets will or trust that has all the standard features of a digital assets will or trust and allows a user to "real time" access said updateable electronic digital assets will or trust to update specific elements designated for update through online access or through phone applications or other electronic applications access. Said specific elements include: designating and/or giving power of attorney to an agent and/or executor of each device, email account, social networking account, online banking/financial account, online media account, and other digital accounts; updating information specific to each account such as account name/number, user name, password, PINs, beneficiaries; instructions as to specifics of the account and instructions as to how the assets should be handled; and/or include any other said updateable electronic digital assets will or trust specific elements identified for "real time" access and/or update capability. Said updateable electronic digital assets will or trust method and systems provide updateable electronic digital asset will or trust reports, wallet (Continued)

cards, and other data, and operate in the environment of a computer network on the World Wide Web in a cloud capacity that is encrypted both in input and output for optimum user access, modifiable capability, and security.

20 Claims, 3 Drawing Sheets

UPDATEABLE ELECTRONIC DIGITAL ASSETS WILL OR TRUST METHOD AND SYSTEMS WITH REAL TIME ACCESS FOR UPDATED DESIGNATED WILL OR TRUST ELEMENTS

CROSS-REFERENCE TO RELATED APPLICATIONS

This is a continuation of application Ser. No. 14/756,822

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BVY THE INVENTOR OR A JOINT INVENTOR

Not Applicable

BACKGROUND OF INVENTION

Field of Invention

The present embodiment generally relates to electronic digital assets will or trust management and to methods and systems for user "real time" access through online access or access through phone apps or other electronic applications which allows users to adjust, modify and/or update specific digital will or trust elements.

Prior Art

Currently, for those who have wills or trusts prepared in the past, virtually none of them reference digital assets because attorneys were not thinking about digital assets. With the immense number of digital assets, such as various devices, email accounts, social networking accounts, online banking/financial accounts, online media accounts, and other digital accounts, it is important for an individual to have in addition to a will or trust, or as part of a will or trust, a digital assets will or trust that includes digital assets, identifies agents and/or executors who will administer them on your behalf after death, identifies the beneficiaries, and provides a means to access each digital asset.

Many attorneys today are including digital assets as part of a client will or trust, and/or will include digital assets in a stand-alone digital will or trust. Either way, digital assets are identified, a executor/agent of each digital asset is identified, a beneficiary is or beneficiaries are identified, access to digital assets, such as account name/number, user name, password, PINs are identified, and instructions as to specifics of an account are identified, along with instructions as to how assets are to be handled. All digital asset information is provided in a digital will or trust, so that an identified executor/agent can identify the digital asset and take appropriate action(s) as per the wishes of the deceased.

Digital wills or trusts are currently in a state of development, and for the most part, include all contents that are currently required by state law, and upon completion, include many elements that can change, need to be changed, or an individual desires to change, and are, therefore, not current unless they are returned to an attorney for change, or if completed on-line, are not current unless the on-line will or trust is submitted with a revision. Revised wills or trusts which include digital assets revisions are then provided by an attorney through the mail to a client, and/or if on-line created, provided to the user by being printed out for signature and public notarization.

The present embodiment provides a method and systems for a updateable electronic digital assets will or trust that has all the standard features of a digital assets will or trust and provides a user "real time" access to an electronic digital assets will or trust to update specific elements through online access or through phone apps or other electronic applications access. Specific elements include: designating an agent and/or executor of each device, email account, social networking account, online banking/financial account, online media account, and other digital accounts; updating information specific to each account such as account name/number, user name, password, PINs, beneficiaries and instructions as to specifics of the account; instructions as to how each asset should be handled; and/or include any other electronic digital assets will or trust specific elements identified for "real time" access and/or update capability. The present embodiment also provides for electronic "real time" signature to authorize and implement updateable electronic digital assets will or trust specific elements modifications, deletions and/or additions.

Essentially, with the use of the present embodiment method and systems for a "real time" updateable electronic digital assets will or trust, said updateable electronic digital assets will or trust is always current, and upon a user's demise, will always be able to provide the designated executor/agent with the information needed to carry out the wishes of the deceased.

SUMMARY

1. According to the teachings of the present embodiment, it comprises:

A method and systems that provide for an updateable electronic digital assets will or trust that has all the standard features of a digital will or trust, including power of attorney, and allows a user to "real time" access said updateable electronic digital assets will or trust to update specific portions or elements through online access or access through phone applications or other electronic applications. Specific portions or elements include: designating an agent and/or executor of each device, email account, social networking account, online banking/financial account, online media account, and other digital accounts; updating information specific to each account such as account name/number, user name, password, PINs; instructions as to specifics of the account, such as a beneficiary and/or beneficiaries; instructions as to how the assets should be handled; and/or includes any other updateable electronic digital assets will or trust specific elements identified for "real time" access and/or update capability.

A user's interaction with said updateable electronic digital assets will or trust is identified in said updateable electronic digital assets will or trust which is/are stored in computer memory.

A updateable electronic digital assets will or trust is formed and specific elements in said updateable electronic digital assets will or trust are identified for access and modification using direct on-line input or telephone (phone) apps and/or through other electronic applications.

One advantage of the invention lies in the user's ability to modify or change identified specific elements of said updateable electronic digital assets will or trust at any time and in "real time" and have them placed into effect without having to contact legal counsel to make changes and/or modifications.

Another advantage of the invention is that said updateable electronic digital assets will or trust can be economically altered through phone apps or using direct on-line input, and/or through other electronic applications.

Another advantage of the invention is that said updateable electronic digital assets will or trust can be auto updated, i.e., prompted to update, and with user electronic digital consent, will update said electronic digital assets will or trust in "real time" to change it to be in compliance with changes to user location's current federal, state, and local law.

Another advantage of the invention is that said updateable electronic digital assets will or trust can be auto updated when user changes location of residence, i.e., when a user inputs a change of location in an application indicating a different state/location than that which is in user's "original" said updateable electronic digital assets will or trust, user is prompted to update in accordance with user's new location's federal, state, and local digital assets law, and with user electronic digital consent, user's said updatable electronic digital assets will or trust will be updated in "real time" to change it to be in compliance with changes appropriate to user's new location's federal, state, and local law.

Additionally, another advantage of the invention is that said updateable electronic digital assets will or trust can be auto updated when user changes electronic digital asset login information, i.e., when login information is changed by a user into an application, user is prompted to update, and with user electronic digital consent, digital asset login information, including security questions and answers, in "real time" will be updated in said updateable electronic digital assets will or trust.

Another advantage of the invention is that said updateable electronic digital assets will or trust can be auto updated to include a new digital assets device, i.e., with the installation of said updateable electronic digital assets will or trust application on said new digital assets device, and with user electronic digital consent, said updateable electronic digital assets will or trust application will auto detect digital assets device unique identification number "UID", add said new digital assets device, and allow user to add in "real time" all related said new digital assets device specific elements details, such as executor/agent, beneficiary, etc., to said updateable electronic digital assets will or trust.

Additionally, said updateable electronic digital assets will or trust provides a user with listings of all digital assets, including devices, accounts, agents and/or executors of the device/account and all other information regarding digital assets, such as ID's, PINs, passwords, beneficiaries, etc. and any and all instructions to agents and/or executors as to the handling of listed digital assets.

BRIEF DESCRIPTION OF THE DRAWINGS

The embodiment is herein described by way of example only, with reference to the accompanying drawings, wherein.

Figure 1:
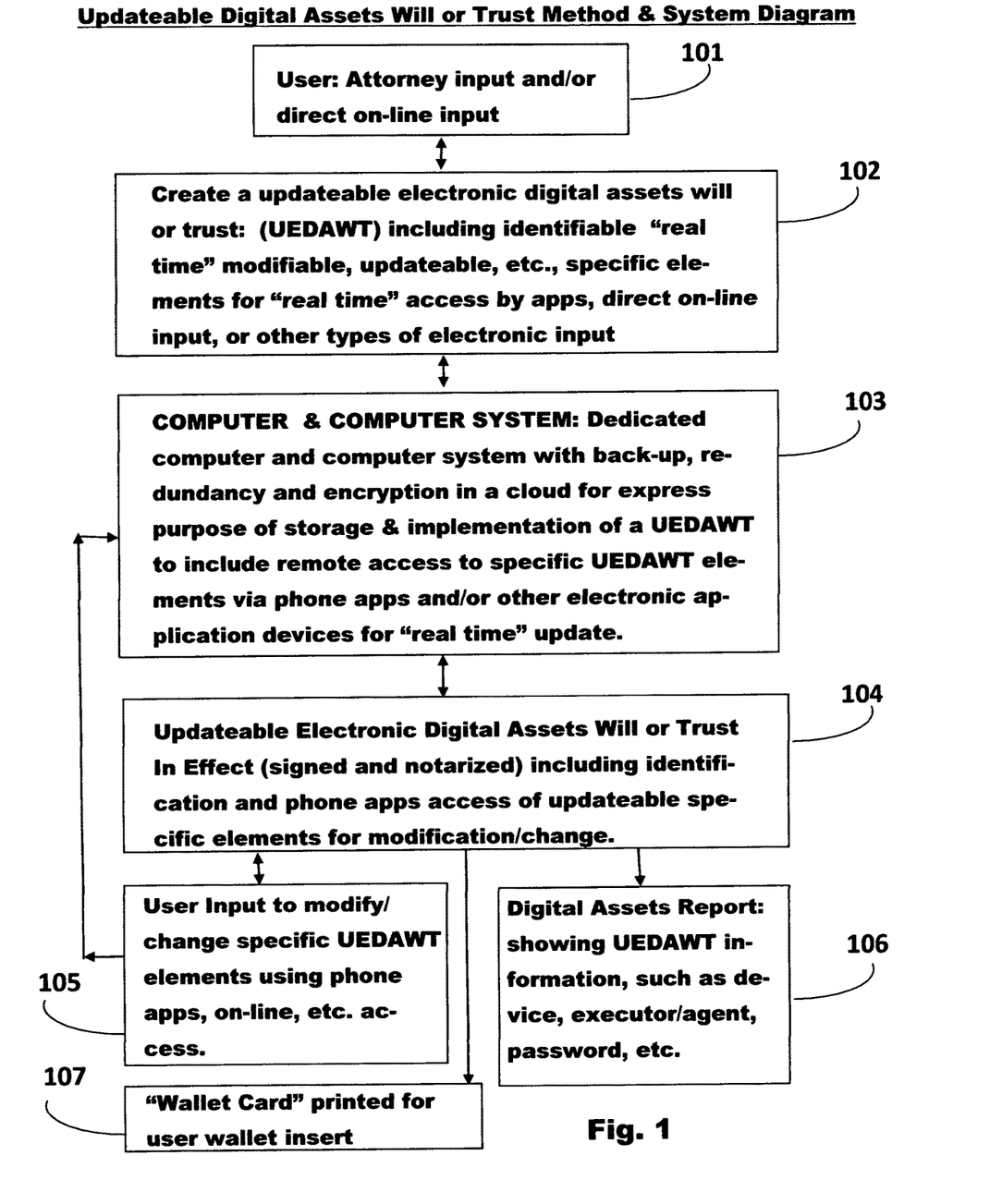
FIG. 1, related to FIG. 2 and FIG. 3, is a block diagram of one embodiment of the invention showing components of a updateable electronic digital assets will or trust method & system that is part of a network system on the World Wide Web.
Figure 2:
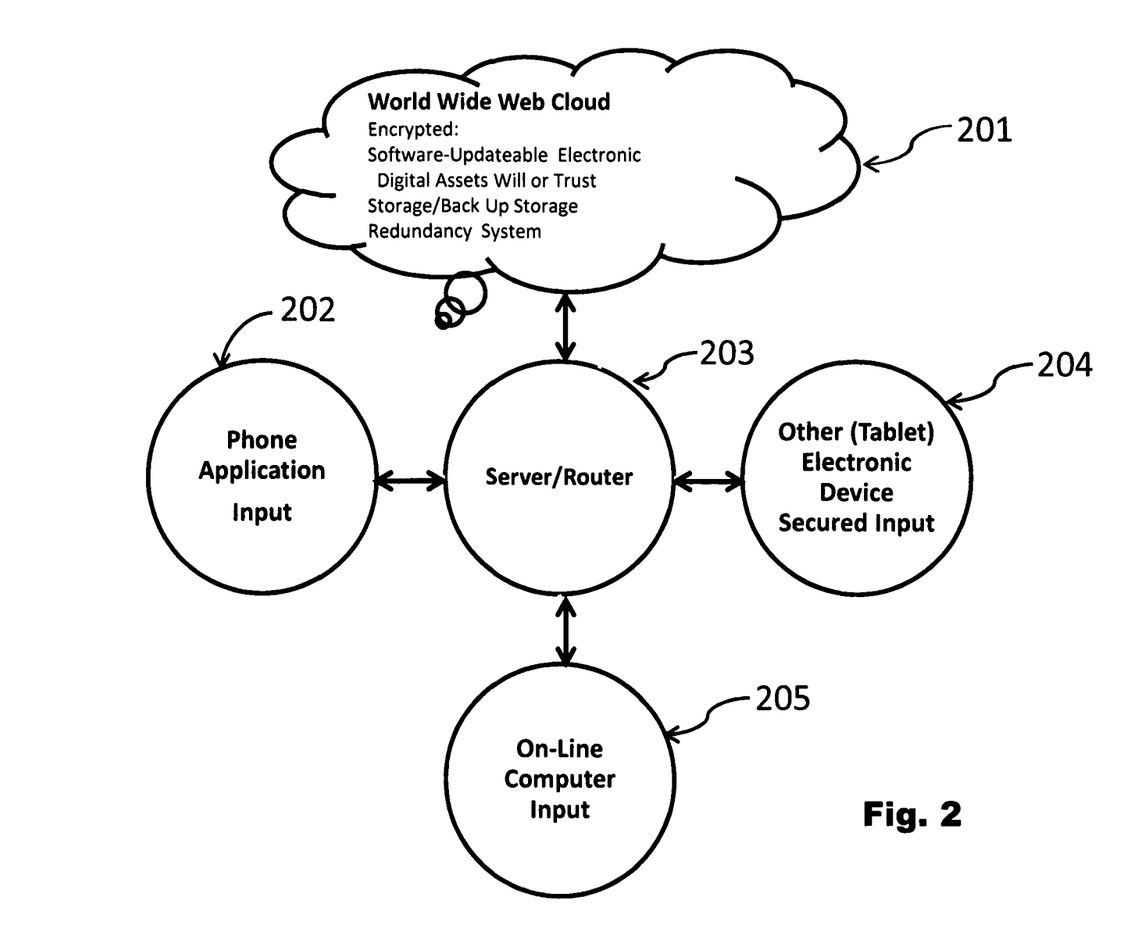
FIG. 2, related to FIG. 1 and FIG. 3, is a computer network schematic diagram that shows that said updateable digital assets will or trust method & system operates in an environment of a computer network on the World Wide Web in a cloud capacity that is encrypted both in input and output for optimum user access, modifiable capability, and security.
Figure 3:
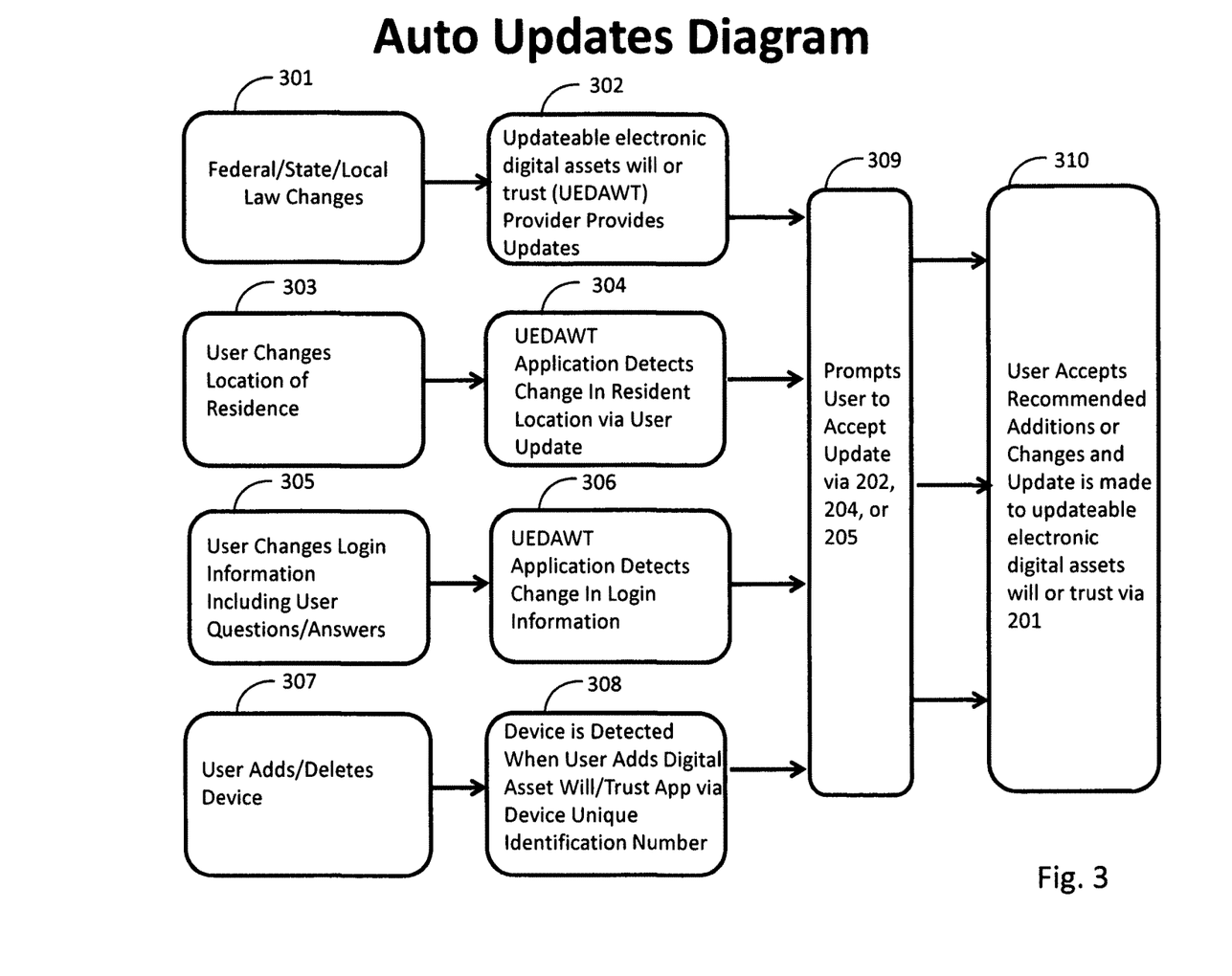
FIG. 3, related to FIG. 1 and FIG. 2, is a auto-update diagram that shows that a updateable electronic digital assets will or trust has the capability of auto-updating itself, with user electronic approval, with updateable digital assets will or trust specific element information update, when federal, state, or local digital assets laws are initiated or changed, when a user changes his/her state and/or local location information, when a user changes his/her device login information, and/or when a user down loads a updateable digital assets will or trust method and systems application onto user's new digital device.

DETAILED DESCRIPTION—FIG. 1, FIG. 2, FIG. 3

In one embodiment, reference is made to FIG. 1, which is part and parcel of FIG. 2 and FIG. 3, where an invention block diagram shows the components of a updateable electronic digital assets will or trust method and system beginning with FIG. 1, 101 where initial input for a updateable electronic digital assets will or trust is entered by either a user, another user designated by a user, an attorney, or an attorney and/or user in cooperation, in order to include in said updateable electronic digital assets will or trust all digital assets, such as each device, email account, social networking account, online banking/financial account, online media account, and other digital accounts; include the updating information specific to each digital asset account such as account name/number, user name, password, and PINs; include the instructions as to specifics of the account, such as a beneficiary or beneficiaries; include the instructions as to how a asset account should be handled; and/or include the input to any other updateable electronic digital assets will or trust specific elements identified for "real time" access and/or update capability.

As per FIG. 1, 102, a updateable electronic digital assets will or trust "UEDAWT" is created to include all the standard items included in a digital assets will or trust, including power of attorney, and is created in accordance with federal, state, and/or local laws governing the content of a digital assets will or trust. Also, included in said UEDAWT are identifiable "real time" modifiable, updateable, etc., specific elements for "real time" access by phone applications, direct on-line input, and/or other types of electronic input to update specific elements of said updateable electronic digital assets will or trust.

As per FIG. 1, 103, and in conjunction with FIG. 2, a computer and related computer systems are a part of a computer network with cloud capability for UEDAWT information storage, back-up, redundancy and encryption and are created and supported for the express purpose of storage and implementation of a UEDAWT to include remote access to specific UEDAWT elements via phone applications and/or other electronic application devices for "real time" user modifications/changes to said UEDAWT.

As per FIG. 1, 104, an updateable electronic digital assets will or trust is in effect (signed and notarized) which includes identification of, and phone applications access to, all updateable specific elements for remote user change and/or modification to said UEDAWT.

As per FIG. 1, 105, a user input capability with proper access and electronic signature authority to modify/change specific UEDAWT elements using remote capability, such as phone applications, on-line input, and any other remote electronic device input.

As per FIG. 1, 106, a user with this embodiment of a UEDAWT will be able to be provided with a UEDAWT report and listing which shows all UEDAWT digital assets information, such as a device, the device's executor/agent, password, password questions/answers, etc.

Finally, in reference to embodiment reference FIG. 1, as per FIG. 1, 107, a user with this embodiment of an UEDAWT will be able to be provided a "wallet card" which identifies the existence of a updateable electronic assets will or trust and indicates contact information of whom to contact upon a UEDAWT owner's demise.

Reference is now made to FIG. 2, part and parcel of FIG. 1 and FIG. 3, of the current embodiment, which is a computer network schematic diagram that shows that a updateable digital assets will or trust method & system operates in the environment of a computer network on the World Wide Web in a cloud capacity that is encrypted both in input and output for optimum user access, modifiable capability, and security.

As shown in FIG. 2, first, second, and third computers, 202, 204, and 205, respectively, are computers which are interconnected via a server/router FIG. 2, 203, Any number of different network devices can be substituted for the computers, including CD, MP3, and DVD players, computer tablets and notebooks, cell phone applications and the like. A router can be substituted for the server/router FIG. 2, 203, as well.

The server/router is connected to a publicly accessible network, such as the internet or a World Wide Web cloud FIG. 2, 201. Using a World Wide Web cloud FIG. 2, 201, said cloud would house updateable electronic digital assets will or trust software, storage, back-up storage, redundancy systems and would be in an encrypted format for security.

The World Wide Web cloud FIG. 2, 201, dedicated to an updateable electronic digital assets will or trust software and data storage, back-up storage, redundancy systems are in an encrypted format so that the integrity of said updateable electronic digital assets will or trust cannot be compromised, and any and all modifications to the identified updateable electronic digital assets will or trust "UEDAWT" specific elements can be made and electronically signed by the user.

Reference is now made to FIG. 3, part and parcel of FIG. 1 and FIG. 2, of the current embodiment, which is an auto-updates diagram that shows that a user's updateable digital assets will or trust has the capability of updating itself, with user electronic approval, with updateable digital assets will or trust specific element information updates when: federal, state, or local digital assets laws are initiated or changed; a user changes his/her state location information; a user changes his/her digital device logon information; and/or when a user downloads a updateable digital assets will or trust method and systems application onto a new user digital device.

As shown in FIG. 3, changes from different sources 301, 303, 305, and 307 can occur and can be auto-updated in a updateable electronic digital assets will or trust. A change in federal, state, or local laws relative to digital assets will be recognized by the updateable electronic digital assets will or trust provider FIG. 3, 301, and based on said law changes, said updateable electronic digital assets will or trust provider will put together updateable electronic digital assets will or trust appropriate changes for said law compliance, FIG. 3, 302, and will prompt a updateable electronic digital assets will or trust user to review recommended additions or changes and to auto-update FIG. 3, 309, and upon user electronic acceptance of recommended additions or changes, update is made to user's said updateable electronic digital assets will or trust FIG. 3, 310.

Additionally, when user inputs and/or updates a change of residence location in an application which indicates a different state or local location than that in user's "original" updateable electronic digital assets will or trust "UEDAWT" FIG. 3, 303, UEDAWT application detects a change in resident location FIG. 3, 304, user is prompted to auto-update in accordance with user's new location federal, state, and local digital assets law FIG. 3, 309, and with user electronic digital consent, user's said updatable electronic digital assets will or trust will be updated in "real time" to change it to be in compliance with changes to user's new location federal, state, and local law, FIG. 3, 310.

Also, when user changes login information in an application, including user questions and answers, FIG. 3, 305, UEDAWT application detects change in login information to a digital asset, FIG. 3, 306, user is prompted to auto-update, FIG. 3, 309, and with user electronic digital consent, user's digital asset login information, including security questions and answers, in "real time" is updated or created in user's said updateable electronic digital assets will or trust, FIG. 3, 310.

Additionally, when user adds a digital device, FIG. 3, 307, and with installation of said updateable electronic digital assets will or trust application on new user digital assets device, FIG. 3, 307, device is auto-detected via device unique identification number, UID, FIG. 3, 308, user is prompted to accept said auto-detected device for said UEDAWT specific elements input, FIG. 3, 309, and with user electronic digital consent, said updateable electronic digital assets will or trust application will add said new digital assets device, and allow said UEDAWT application to add all user related new digital assets device specific elements, such as executor/agent, beneficiary, etc., to update said updateable electronic digital assets will or trust, FIG. 3, 310.

Advantages

From the description above, a number of advantages of some embodiments of the present invention—a method and systems that provide for an updateable electronic digital assets will or trust that has all the standard features of a standard digital assets will or trust and allows a user to "real time" access said electronic digital assets will or trust to update specific portions or elements through online access or access through phone or other electronic applications—are as follows:

(a) Allows a user to set up an updateable electronic digital assets will or trust at a user's convenience, either on-line and/or with an attorney through the use of telephone and/or computer access.

(b) Provides 24/7 access to specific elements of said updateable electronic digital assets will or trust whereby if any or all of said updateable electronic digital assets will or trust specific elements need to be changed by the user, it can be completed "real time" using a phone application, on-line access or through other available secured communication with said updateable electronic digital assets will or trust.

(c) Provides for auto update, with user electronic digital consent, of said electronic digital assets will or trust to change it to be in compliance with changes to client location's current federal, state, and local law.

(d) Provides for auto update, with user electronic digital consent, of said updateable electronic digital assets will or trust when user changes location of residence, i.e., when user inputs a change of location in an application indicating a different state or local location than that which is in user's "original" updateable electronic digital assets will or trust, user is prompted to update in accordance with user's new location federal, state, and local digital assets law, and with user electronic digital consent, user's said updatable electronic digital assets will or trust will be updated in "real time" to change it to be in compliance with changes appropriate to user's new location's federal, state, and local law.

(e) Provides for auto update, with user electronic digital consent, of said electronic digital assets will or trust to update digital asset login information, including security questions and answers, in "real time" when digital asset login is updated or created in an application, e.g. when login credentials are updated in an application, user will be prompted to approve an auto-update of login credentials in said updateable electronic digital assets will or trust.

(f) Provides for auto update, with user electronic digital consent, to add auto detected digital device with unique identification "UID" when updated electronic digital assets will or trust application is installed on said device, and also adds all the other user identified related digital asset specific elements details, such as executor/agent, beneficiary, etc., to said updateable electronic digital assets will or trust.

(g) Allows for updateable electronic digital assets will or trust device identification, accesses and deceased instructions for the handling of digital assets to executor(s) and/or agent(s) via contact with said updateable electronic digital assets will or trust provider.

(h) Provides an updateable electronic digital assets will or trust user with a listing of all his/her updateable electronic digital assets will or trust assets, accesses, and digital asset instructions for continuous review and modification.

(i) Provides an updateable electronic digital assets will or trust user with a printed "wallet" card which identifies the existence of a updateable electronic digital assets will or trust, indicates said will or trust's provider, and indicates how to contact said will or trust's provider in the case of updateable electronic digital assets will or trust user's demise.

(k) Provides for a updateable electronic digital assets will or trust computer system which includes updateable electronic digital assets will or trust software and data storage, redundancy and back-up systems housed in encrypted form in a cloud/internet environment, and includes related programs, files and other electronic data related to providing user's with 24/7 access and up-date capability to their updateable electronic digital assets will or trust.

CONCLUSION, RAMIFICATIONS, AND SCOPE

Accordingly, the reader will see that according to this embodiment, it provides for a updateable electronic digital assets will or trust "UEDAWT" method and systems that have all the features of a standard digital assets will or trust and in addition, allows a user "real time" access to said electronic digital assets will or trust to update specific elements through online access or through phone applications or other electronic applications access. Said specific elements include: designating an agent and/or executor of each device, email account, social networking account, online banking/financial account, online media account, and other digital accounts; updating information specific to each account such as account name/number, user name, password, PINs; instructions as to specifics of the account, such as beneficiaries; instructions as to how the assets should be handled; and/or include any other said electronic digital assets will or trust specific elements identified for "real time" access and/or update capability.

While the above description contains many specificities, these should not be construed as limitations on the scope of any embodiment, but as exemplifications of the presently noted embodiments thereof. Many other ramifications and variations are possible within the teachings of the various embodiments, such as those having additional advantages in that:

It permits the creation of a on-line user and/or attorney developed updateable electronic digital assets will or trust with all the contents and features of a standard, state oriented, digital assets will or trust which identifies: the agent(s) and/or executor(s) designated by user's to control user's digital assets upon user's demise; the various digital devices and digital accounts; the various access codes and/or means for secure access; and identifies instructions as to the specifics and handling of digital account(s).

It addresses "real time" access to said updateable electronic digital assets will or trust, including but not limited to access through on-line connection, phone applications and other electronic applications access to modify/change said specific UEDAWT elements, such as device and/or account agent and/or executor identification, user name, password, beneficiary, etc., all of which were identified in said updateable electronic digital will or trust for modification and/or change.

It provides for auto update, with user electronic digital consent, of said electronic digital assets will or trust to change it to be in compliance with changes to client location's current federal, state, and local law.

It provides for auto update, with user electronic digital consent, of said updateable electronic digital assets will or trust when user changes location of residence, i.e., when user, in an application, inputs a change of location indicating a different state/location than that which is in user's "original" updateable electronic digital assets will or trust, user is prompted to update in accordance with user's new location's federal, state, and local digital assets law, and with user electronic consent, user's said updatable electronic digital assets will or trust will be updated in "real time" to change it to be in compliance with changes appropriate to user's new location's federal, state, and local law.

It provides for auto update, with user electronic digital consent, of said electronic digital assets will or trust to update digital asset login information, including security questions and answers, in "real time" when digital asset login is updated or created in an application, e.g. when login credentials are updated in an application, user will be prompted to approve an update in said updateable electronic digital assets will or trust.

It provides for auto update, with user digital consent, to add an auto detected digital device when an updateable electronic digital assets will or trust application is installed on said device, and adds said auto detected digital device and all other user identified related digital device specific element details, such as executor/agent, beneficiary, etc., to said updateable electronic digital assets will or trust.

It furnishes a computer system that is fully encrypted, that has the capability of storing and implementing a electronic digital assets will or trust where a user has "real time" access to specific elements in said electronic digital assets will or trust to make and electronically authorize changes and/or modifications, and upon a user's demise, said electronic digital assets will or trust provides agents and executor(s) with the desires of deceased user, a method to obtain and/or access any and all digital assets, and information needed to carry out the wishes of the deceased concerning them.

It permits the formation of a electronic digital assets will or trust "wallet card", which is generated by a computer system storing said electronic digital assets will or trust, which provides for notification of said electronic digital assets will or trust for an individual's digital assets, and identifies who and/or which corporation to contact to obtain user's said electronic digital assets will or trust, so that, upon death, appropriate handling of a deceased user's digital assets can be addressed.

Thus the scope of the invention should be determined by the appended claims and their legal equivalents, and not by the examples given.

I claim:

1. A system for providing a dynamically updatable digital assets will or trust, the system comprising:
   one or more servers that store a user's digital assets will or trust and that provide an interface by which the user's digital assets will or trust can be updated; and
   a mobile application that is configured to execute on the user's mobile device, the mobile application comprising computer executable instructions which when executed dynamically update the user's digital assets will or trust via the interface based on the user's interaction with the mobile device, the mobile application being configured to perform the following while executing on the user's mobile device:
      determining that the user's digital assets will or trust includes user credentials for logging in to a first mobile application;
      in response to the user changing the user credentials for logging in to the first mobile application, detecting that the user credentials for logging in to the first mobile application have been changed;
      prompting the user to confirm whether the user's digital assets will or trust should be updated to reflect the change to the user credentials for logging in to the first mobile application;
      in response to the user confirming that the user's digital assets will or trust should be updated to reflect the change, prompting the user to provide confirmation input to the mobile device to serve as confirmation that the user's digital assets will or trust should be updated to reflect the change to the user credentials for logging in to the first mobile application; and
      sending, to the one or more servers via the interface, the changed user credentials for logging in to the first mobile application along with the confirmation input;
      wherein, in response to receiving the changed user credentials for logging in to the first mobile application and the confirmation input, the one or more servers update the user's digital assets will or trust to include the changed user credentials for logging in to the first mobile application and stores the confirmation input in conjunction with the user's digital assets will or trust as confirmation that the user approved the update to the user's digital assets will or trust.

2. The system of claim 1, wherein the user credentials include a username and a password.

3. The system of claim 1, wherein the user credentials include one or more security questions and answers.

4. The system of claim 1, wherein the mobile application is further configured to perform the following:
   determining that the user's digital assets will or trust is governed by laws of a first location;
   detecting, by the mobile device, that the user is residing in a second location that has different governing laws;
   prompting the user to confirm whether the user's digital assets will or trust should be updated in accordance with laws of the second location;
   in response to the user confirming that the user's digital assets will or trust should be updated in accordance with the laws of the second location, prompting the user to provide second confirmation input to the mobile device to serve as confirmation that the user's digital assets will or trust should be updated in accordance with the laws of the second location; and
   sending, to the one or more servers, the second confirmation input;
   wherein, in response to receiving the second confirmation input, the one or more servers update the user's digital assets will or trust in accordance with the laws of the second location and stores the second confirmation input to reflect the user's approval to update the user's digital assets will or trust in accordance with the laws of the second location.

5. The system of claim 4, wherein detecting that the user is residing in the second location that has different governing laws comprises detecting user input to another mobile application that specifies a current residence of the user.

6. The system of claim 4, wherein detecting that the user is residing in the second location that has different governing laws comprises detecting user input to the mobile application.

7. The system of claim 1, wherein the mobile application is further configured to perform the following:
   detecting that the mobile application is installed on a new mobile device;
   prompting the user to confirm whether the user's digital assets will or trust should be updated to include the new mobile device;
   in response to the user confirming that the user's digital assets will or trust should be updated to include the new mobile device, prompting the user to provide second confirmation input to the mobile device to serve as confirmation for the inclusion of the new mobile device;
   obtaining a unique identifier of the new mobile device; and
   sending, to the one or more servers, the unique identifier and the second confirmation input;
   wherein, in response to receiving the unique identifier and the second confirmation input, the one or more servers update the user's digital assets will or trust to include the unique identifier and stores the second confirmation input to reflect the user's approval to update the user's digital assets will or trust to include the unique identifier of the new mobile device.

8. The system of claim 7, wherein the mobile application is further configured to perform the following:
prompting the user to confirm whether the user's digital assets will or trust should be updated to remove any mobile devices.

9. The system of claim 1, wherein the mobile application is further configured to perform the following:
receiving, via the mobile device, a request to update the user's digital assets will or trust, the request identifying one or more specific elements of the user's digital assets will or trust to update; and
sending the request to the one or more servers such that the one or more servers update the identified specific elements in accordance with the request.

10. The system of claim 9, wherein the identified specific elements include one or more of: a beneficiary, an executor, or an asset.

11. The system of claim 10, wherein the asset comprises one or more of: an email account, a social networking account, a financial account, an online media account, or another account that requires login information.

12. The system of claim 11, wherein the asset further includes account information for an account.

13. The system of claim 12, wherein the account information includes one or more of: an account name or number, a username, an email address, a password, or a pin.

14. The system of claim 9, wherein the mobile application is further configured to perform the following:
presenting, via a user interface of the mobile application, a notification that the user has a digital assets will or trust.

15. The system of claim 14, wherein the notification includes contact information for contacting a provider of the user's digital assets will or trust.

16. The system of claim 1, wherein the mobile application is further configured to perform the following:
detecting that the mobile application is installed on a mobile device that is not included in the user's digital assets will or trust;
prompting the user to confirm whether the user's digital assets will or trust should be updated to include the new mobile device;
in response to the user confirming that the user's digital assets will or trust should be updated to include the new mobile device, prompting the user to provide second confirmation input to the mobile device to serve as confirmation for the inclusion of the new mobile device;
obtaining a unique identifier of the new mobile device; and
sending, to the one or more servers, the unique identifier and the second confirmation input;
wherein, in response to receiving the unique identifier and the second confirmation input, the one or more servers update the user's digital assets will or trust to include the unique identifier and stores the second confirmation input to reflect the user's approval to update the user's digital assets will or trust to include the unique identifier of the new mobile device.

17. The system of claim 16, wherein detecting that the mobile application is installed on a mobile device that is not included in the user's digital assets will or trust comprises detecting that the unique identifier of the new mobile device is not included in the user's digital assets will or trust.

18. The system of claim 1, wherein the mobile application is further configured to perform the following:
determining that the user's digital assets will or trust is governed by laws of a first location;
detecting, from user input to the mobile device, that the user is residing in a second location that has different governing laws;
prompting the user to confirm whether the user's digital assets will or trust should be updated in accordance with laws of the second location;
in response to the user confirming that the user's digital assets will or trust should be updated in accordance with the laws of the second location, prompting the user to provide second confirmation input to the mobile device to serve as confirmation for the update; and
sending, to the one or more servers, the second confirmation input;
wherein, in response to receiving the second confirmation input, the one or more servers update the user's digital assets will or trust in accordance with the laws of the second location and stores the second confirmation input to reflect the user's approval to update the user's digital assets will or trust in accordance with the laws of the second location.

19. The system of claim 18, wherein the detected user input comprises user input to another mobile application that specifies a current residence of the user.

20. The system of claim 18, wherein the detected user input comprises user input to the mobile application.

* * * * *